US009300712B2

(12) United States Patent
Nick et al.

(10) Patent No.: US 9,300,712 B2
(45) Date of Patent: *Mar. 29, 2016

(54) STREAM PROCESSING WITH CONTEXT DATA AFFINITY

(71) Applicant: Pivotal Software, Inc., Palo Alto, CA (US)

(72) Inventors: Jeffrey Mark Nick, Milford, MA (US); David Russell Brown, San Marcos, CA (US); Vinesh Prasanna Manoharan, Buckinghamshire (GB)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,746

(22) Filed: Jun. 12, 2015

(65) Prior Publication Data
US 2016/0036878 A1 Feb. 4, 2016

Related U.S. Application Data

(63) Continuation of application No. 14/450,178, filed on Aug. 1, 2014, now Pat. No. 9,075,670.

(51) Int. Cl.
*G06F 13/00* (2006.01)
*H04L 29/06* (2006.01)

(52) U.S. Cl.
CPC ..................... *H04L 65/60* (2013.01)

(58) Field of Classification Search
CPC .............. G06F 9/542; H04L 29/06027; H04L 29/08072
USPC .................... 719/318; 709/201, 231
See application file for complete search history.

(56) References Cited

U.S. PATENT DOCUMENTS

| 7,114,011 B2 | 9/2006 | Buch et al. |
| 7,882,257 B2 | 2/2011 | Kerr et al. |

(Continued)

FOREIGN PATENT DOCUMENTS

| WO | WO 03/091892 | 11/2003 |
| WO | WO 2007/069951 | 6/2007 |
| WO | WO 2013/153027 | 10/2013 |

OTHER PUBLICATIONS

European Search Report in Application No. Dec. 11, 2015, 6 pages.

(Continued)

*Primary Examiner* — Andy Ho
(74) *Attorney, Agent, or Firm* — Fish & Richardson P.C.

(57) ABSTRACT

Methods, systems, and apparatus, including computer programs encoded on computer storage media, for stream processing with contextual data affinity. One of the methods includes receiving an event at a computing node of a stream processing system that includes one or more computing nodes and data representing a topology of functional modules. At a particular functional module of the topology, an operation that requests access to context data related to the event is determined based on a data attribute of the event. The context data is partitioned among the one or more computing nodes. Context data related to the event is obtained from the computing node. The operation of the particular functional module is processed using the context data, and a modified event is generated. The modified event is provided to a subsequent functional module according to the topology of functional modules.

24 Claims, 6 Drawing Sheets

(56) References Cited

U.S. PATENT DOCUMENTS

| | | |
|---|---|---|
| 8,374,986 B2 | 2/2013 | Indeck et al. |
| 8,655,956 B2 | 2/2014 | Park et al. |
| 8,768,612 B2 | 7/2014 | Bouillet et al. |
| 9,075,670 B1 | 7/2015 | Nick et al. |
| 2012/0291049 A1 | 11/2012 | Park et al. |
| 2013/0047165 A1 | 2/2013 | Goetz et al. |
| 2013/0346970 A1 | 12/2013 | Lam et al. |
| 2014/0082178 A1 | 3/2014 | Boldyrev et al. |
| 2015/0134626 A1* | 5/2015 | Theimer et al. ............... 707/693 |
| 2015/0169786 A1* | 6/2015 | Jerzak et al. ................. 707/755 |

OTHER PUBLICATIONS

Kim and Kim, "A TMO-Based Software Architecture for Distributed Real-Time Multimedia Processing," Object-Oriented Real-Time Dependable Systems, pp. 42-49, Jan. 15, 2003.

Sanftmann et al., "Distributed Context-Aware Visualization," 8th IEEE International Workshop on Middleware and System Support for Pervasive Computing, pp. 251-256, Mar. 21, 2011.

Vijayakumar et al., "Calder Query Grid Service: Insights and Experimental Evaluation," CCGRID '06, 5 pages, May 16-19, 2006.

* cited by examiner

STREAM PROCESSING WITH CONTEXT DATA AFFINITY

CROSS-REFERENCE TO RELATED APPLICATION

This application is a continuation of U.S. patent application Ser. No. 14/450,178, filed on Aug. 1, 2014, now U.S. Pat. No. 9,075,670, and entitled "Stream Processing With Context Data Affinity," the entire contents of which is herein incorporated by reference.

BACKGROUND

This specification relates to stream computing.

Stream computing refers to systems and techniques for continually processing unbounded sequences of data objects in real time, i.e., a sequence that is not limited to a predetermined number of data objects or rate of arrival of data objects; such a sequence is referred to as a stream. For example, a stream of objects may represent page requests received by a web site, telemetry events from sensors, or microblog messages posted by users. Stream processing systems can perform a variety of tasks, including providing immediate search results as data objects are found and continually processing new data objects as they are received.

SUMMARY

This specification describes how a system can process events in a stream processing system according to data affinity with context data partitioned across multiple computing nodes. The context data can be stored in fast operational memory of each computing node, resulting in high-throughput, low-latency processing of event streams that require context information.

In general, one innovative aspect of the subject matter described in this specification can be embodied in methods that include the actions: receiving an event at a computing node of a stream processing system, wherein the stream processing system comprises one or more computing nodes and data representing a topology of functional modules, wherein each functional module defines one or more operations to be performed on an event and an output destination for the event, and wherein all functional modules of the stream processing topology are installed on each of the computing nodes; at a particular functional module of the topology, determining that an operation requests access to context data related to the event based on a data attribute of the event, wherein the context data is partitioned among the one or more computing nodes, and wherein each partition of context data is stored in operational memory of the respective computing node; obtaining, from the operational memory of the computing node, the context data related to the event; processing the operation of the particular functional module using the context data obtained from the operational memory of the computing node including generating a modified event; and providing the modified event to a subsequent functional module according to the topology of functional modules.

These and other embodiments can each optionally include one or more of the following features. Each functional module of the stream processing topology executes within a same operating system process of the computing node of the stream processing system. Processing the operation of the particular functional module using the context data comprises modifying the context data in operational memory of the computing node. The actions include receiving a different second event at the computing node of the stream processing system; at the particular functional module, determining that the operation for the second event requests access to the modified context data related to the second event based on a particular data attribute of the second event; obtaining, from the operational memory of the computing node, the modified context data; and processing the operation of the particular functional module using the modified context data obtained from the operational memory of the computing node. The actions include receiving a different second event at the computing node of the stream processing system; at the particular functional module, determining that the operation requests access to context data related to the different event based on a particular data attribute of the different event; determining that the requested context data is maintained in a partition stored on a different computing node; and providing the second event to the particular functional module the different computing node. The actions include maintaining, by the computing node, modules for the functional modules of the stream processing topology and the context data within a same operating system process. The actions include receiving, at the stream processing system, the event; determining a computing node maintaining a partition of context data related to the event; and routing the event to the determined computing node. Determining a computing node comprises: processing an operation to modify a data affinity hint in the event; determining, from the modified data affinity hint, an identifier of a partition of context data; and determining, from the identifier of the partition of context data, the different computing node storing the partition of context data in operational memory.

Particular embodiments of the subject matter described in this specification can be implemented so as to realize one or more of the following advantages. A stream processing system can reduce the latency for accessing context data for an event by partitioning the context data into operational memory of the stream processing system. A system can further reduce latency by executing the stream processing operations in a same operating system process as a process maintaining the context data in operational memory. In this way the stream processing system can reduce latency due to data locking issues, race conditions, and by not requiring individual computing nodes in the stream processing system to call an outside database for context data. Additionally the stream processing system can provide real-time mediation capabilities.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes techniques for high throughput, low-latency processing of events by a stream processing system. In one example environment, a stream processing system receives data objects that each represents a unit of activity on a telecommunications network, e.g., a user attempting to send a short message service (SMS) message or a user initiating a phone call. In this specification, an event is a data object having one or more data attributes and representing a unit of activity, and an event stream is an unbounded sequence of events received by a stream processing system.

In particular, a stream processing system can use context data stored in memory to effect the processing of events. Context data is pre-existing data related to an event in a stream of events and includes data that does not occur within data attributes of the event itself. For example, an event that represents a phone call being initiated may include a data attribute that includes a user's phone number. However, the event would typically not include other information about the user, e.g., a user's home address. Rather, the user's home address is stored and mutated in operational memory by the stream processing system for low-latency access.

Figure 1:
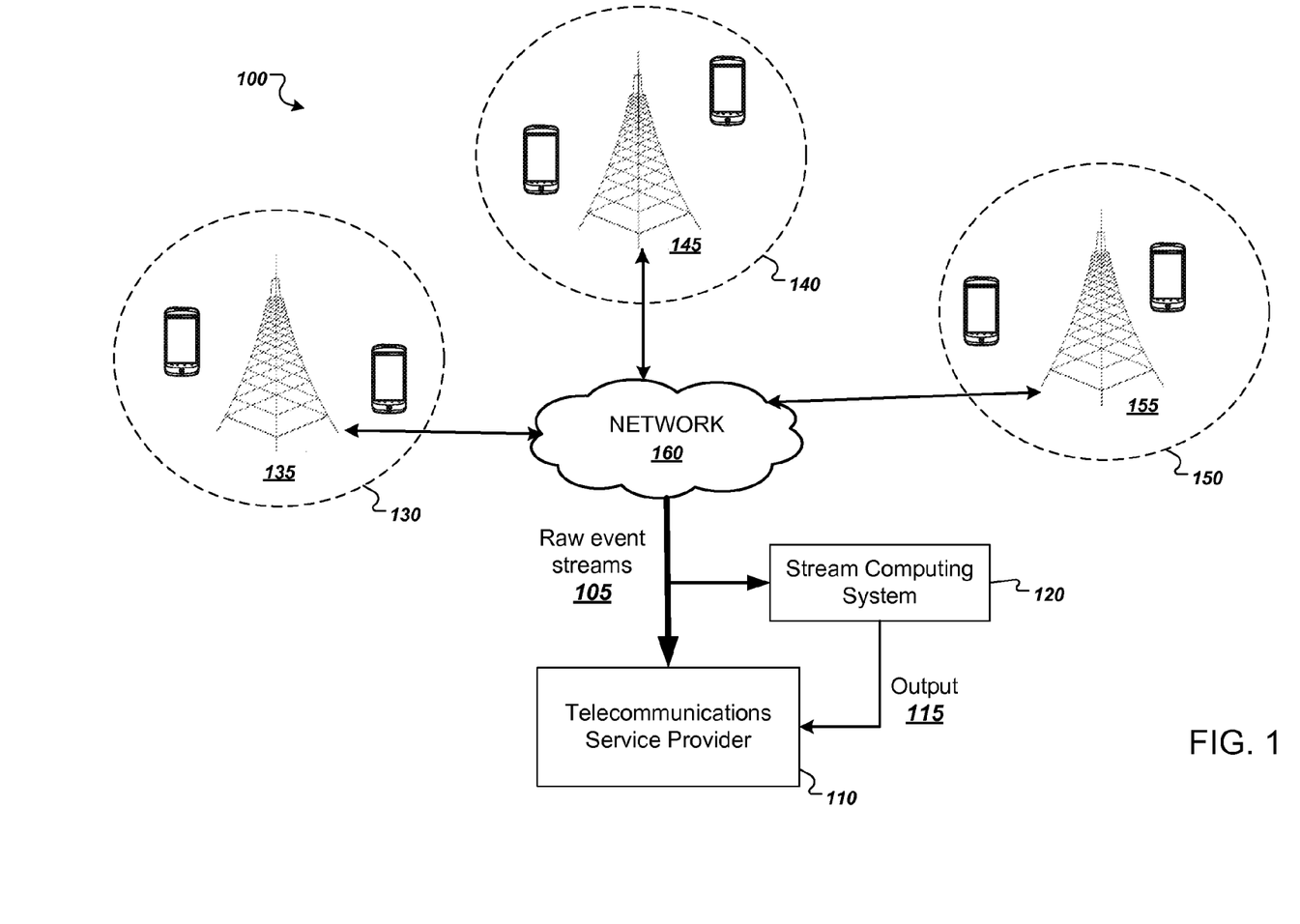
FIG. 1 is a diagram of an example system.

FIG. 1 is a diagram of an example system 100. The system 100 includes a telecommunications service provider 110 in communication with a network 160 of telecommunications elements 135, 145, and 155, e.g., cellular service towers or telemetry sensors. Each of the telecommunications elements 135, 145, and 155 provides telecommunications service to user devices over respective geographic areas 130, 140, 150, which are typically partially overlapping.

The telecommunications elements 135, 145, and 155 communicate over, and are part of, the network 160. The network 160 can include, for example, a wireless cellular network, a wireless local area network (WLAN) or Wi-Fi network, a Second Generation (2G), Third Generation (3G), or Fourth Generation (4G) network, or any other appropriate telecommunications network. The network 160 may also include a wired Ethernet network, a private network such as an intranet, a public network such as the Internet, or any appropriate combination of these networks.

The telecommunications elements 135, 145, and 155 can provide raw event streams 105 representing different aspects of communications between user devices over the network 160. The telecommunications service provider 110 can take advantage of a stream computing system 120 that processes the raw event streams 105 to obtain real-time output 115 for the telecommunications service provider 110. The stream computing system 120 includes multiple computing nodes each implementing a stream processing framework in which each node of the stream processing system can access context data stored in fast, operational memory.

In computing the output 115 for the telecommunications service provider 110, the stream computing system 120 obtains context data from operational memory for each event, e.g., user account information. The stream computing system 120 includes multiple computing nodes that each store context data related to events. The stream computing system 120 provides each event to a computing node that is likely to store context data for the event. If during processing an event needs context data not stored in the computing node it's located in, the stream computing system 120 provides the event to a different computing node storing the relevant context data. In this way the computing node does not have to make a time-consuming call to an outside database storing context data, obtain the context data, lock the context data to stop modification of it, and store the context data upon the completion of the use of the context data by the computing node.

For instance, a raw event stream 105 can represent users initiating phone calls, and the context data related to a particular event can identify a user account of a communications device, e.g., a cell phone, that placed each call. The output 115 can be, for example, whether a recipient of the call is identified by the telecommunications service provider 110 as a friend or family member of the user initiating the phone call, which may affect pricing for the phone call. Since the output 115 is computed at a rapid speed, the stream computing system 120 stores context data for each event in the computing node that also computes the output 115 for the respective event.

Some techniques in this specification will be described in the specific context of classifying events in a telecommunications network. However, such techniques can be employed by any appropriate stream processing system. For example a wind farm having hundreds or thousands of wind turbines can generate millions of events each second. In processing an event from a particular wind turbine, the recent, e.g., last several minutes, of events received from a particular wind turbine and its neighbors may be required to accurately compute changing wind conditions in real-time. A stream computing system 120 can process the received events in computing nodes to constantly tune the parameters of the wind farm according to context data related to each received event. The stream computing system 120 can thus detect dangerous trends in real time and react accordingly, e.g., shutting down turbines to avoid costly damage or destruction.

Figure 2:
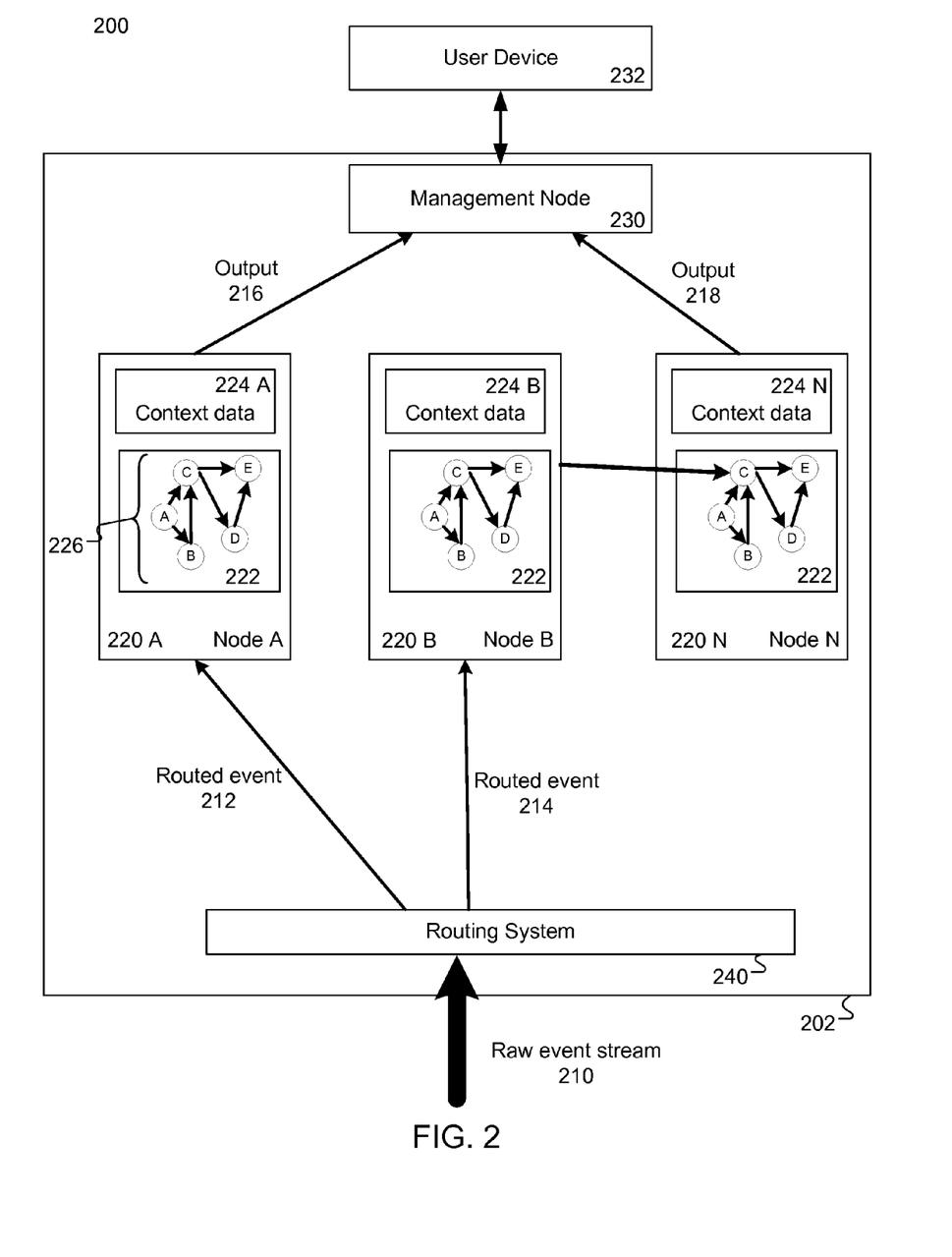
FIG. 2 is a diagram of an example stream processing system that includes a stream processing node.

FIG. 2 is a diagram of an example system 200 that includes a stream processing system 202. The stream processing system 202 includes multiple stream processing nodes 220A-N. The stream processing nodes 22A-N implemented using virtual or physical computing nodes, e.g., virtual nodes installed as respective virtual machines on one or more computer systems, or virtual nodes installed as respective modules of an operating system on one or more computer systems. In some other implementations each stream processing node can be a respective physical computing node, e.g., a computer system. Although only three nodes are shown, the stream processing system 202 can include hundreds or thousands of stream processing nodes.

The stream processing system 202 also includes a routing system 240, which is in communication with the stream processing nodes 220A-N over one or more communications networks, e.g., a local area network or a wide area network, e.g., the Internet. The routing system 240 can be implemented as a separate system of one or more computers or as part of a particular stream processing node.

The stream processing nodes 220A-N receive events, process the events, and provide output, e.g., output 216 and 218, to a management node 230. Additionally, the stream processing system 202 is in communication with a user device 232. Each of the management node 230 and the user device 232 can be implemented on one or more computers, e.g., servers, desktop computers, or other stationary or portable devices, that include one or more processors and computer readable media.

Each of the stream processing nodes 220A-N processes events using a stream processing engine 222. The stream processing engine 222 is a software application that defines a topology 226 of operations for processing received events. The topology is typically arranged as a directed, acyclic graph ("DAG") that includes functional modules each defining one or more operations to be performed on an event. The functional modules of the topology 226 are connected by logical channels that can identify respective subsequent functional modules to receive an event. The multiple functional modules can be implemented as software modules executing within a same operating system process on each of the stream processing nodes 220A-N.

Each stream processing node 220A-N of the stream processing system 202 typically includes all operations of all functional modules of the topology 226. Thus, a single event can be processed according to the stream processing topology 226 by a single computing node without performing interprocess or inter-node communications.

Each of the stream processing nodes 220A-N has operational memory 224, which generally includes high-speed memory designed for fast random access by a processor, e.g., dynamic random access memory (DRAM). Each of the stream processing nodes 220A-N maintains a partition of context data, with each partition of context data maintained in operational memory by a same operating system process executing the stream processing engine 222. For example, the operating system process can obtain context data for a particular event and then process the event using the context data within the same operating system process, e.g., in the same process of a JAVA virtual machine.

The context data is generally partitioned across the stream processing nodes 220A-N, with each stream processing node receiving a particular partition of the context data, e.g., context data 224A-N. However, some context data can be stored by each stream processing node if the context data is sufficiently small.

If context data required by a particular functional module of the topology 226 is not located in operational memory of the same computing node, the functional module can route the event to a functional module of a particular computing node that does have the required context data in operational memory.

The stream processing system 202 can partition context data so that particular context data related to a particular event is likely to be located on a same particular stream processing node as other context data related to the particular event. For example, a system can partition context data according to area codes because users are likely to make phone calls to phone numbers within a same area code rather than phone numbers in different area codes. In this way the stream processing system 202 can avoid providing events to multiple stream processing nodes unnecessarily.

When the routing system 240 receives an event included in a raw event stream 210, the routing system 240 routes the event according to data affinity with the partitions of context data 224A-N. Routing by data affinity refers to distributing an event to a computing node that is likely to maintain context data related to the event. In some implementations the routing system can route each received event by obtaining information included in each event, and determining a partition of context data that stores context data related to the obtained information. For instance, the routing system 240 can obtain a customer key number included in an event, and determine a partition of context data that stores context data related to the particular customer key number. The routing system 240 can store data identifying partitions of context data with stream processing nodes storing the respective partition. The routing system 240 can then provide the event to the stream processing node 220A that stores the partition of context data.

In some implementations, an event can include a data affinity hint. A data affinity hint identifies a partition of context data that is likely to have context data for the event. In some implementations a data affinity hint can be metadata included in an event that identifies a partition of context data. The data affinity hint can also be information appended to a data tuple defining an event, or can be information included in a message header used to route the event to a particular stream processing node.

The routing system routes the event 212 to stream processing node 220A. Upon receiving the routed event 212, the stream processing engine 222 performs the operations identified by the first functional module to operate on the routed event 212. After the operations are performed, the logical channel connecting the first and second functional modules of the topology 226 routes the event to the second functional module. If the data affinity hint indicates that context data for the event is likely to be included in a different partition of context data stored on a different computing node, the event can be routed to a second functional module on the different computing node.

A logical channel between functional modules can also modify the data affinity hint in the routed event 212. The modified data affinity hint informs the stream processing engine 222 whether the routed event 212 should remain in the stream processing node 220A, or should be provided to a different stream processing node. That is, the new data affinity hint can inform the stream processing engine 222 that context data, e.g., a different type of context data, for the routed event 212, which is needed for the subsequent functional module, is located in a partition of context data stored in a different stream processing node.

As shown in FIG. 2, the stream processing node 220A has determined that context data for the routed event 212 is maintained in the stream processing node 220A. The logical channel might have included an operation to modify the data affinity hint, however the data affinity hint identified a partition of context data that is stored in stream processing node 220A. Additionally, the logical channel might not have included an operation to modify the data affinity hint, so the routed event 212 would also remain in stream processing node 220A. The stream processing node 220A provides the routed event 212 to the remaining functional modules in the stream processing engine 222, and provides an output of the stream engine processing 222 to a management node 230. The management node can then provide the output 216 to a user device 232.

When the stream processing node 220B receives the routed event 214, the stream processing engine 222 performs the operations identified by the first functional module on the event 214. After the operations are performed, the logical channel connecting the first and second functional modules can route the event according to a data affinity hint in the routed event 214. Upon determining that context data for the routed event 214 is stored in a different stream processing node, the stream processing node 220B provides the routed event 214 to the different stream processing node 220N. Since each stream processing node includes all functional modules of the stream processing topology 226, the second functional module of the different stream processing node 220N can operate on the routed event 214 to continue the process flow defined by the topology 226.

The stream processing node 220N then provides an output 218 corresponding to the routed event that was initially received by the stream processing node 220B to the management node 230. The management node 230 can then provide the output 218 to the user device 232.

Figure 3:
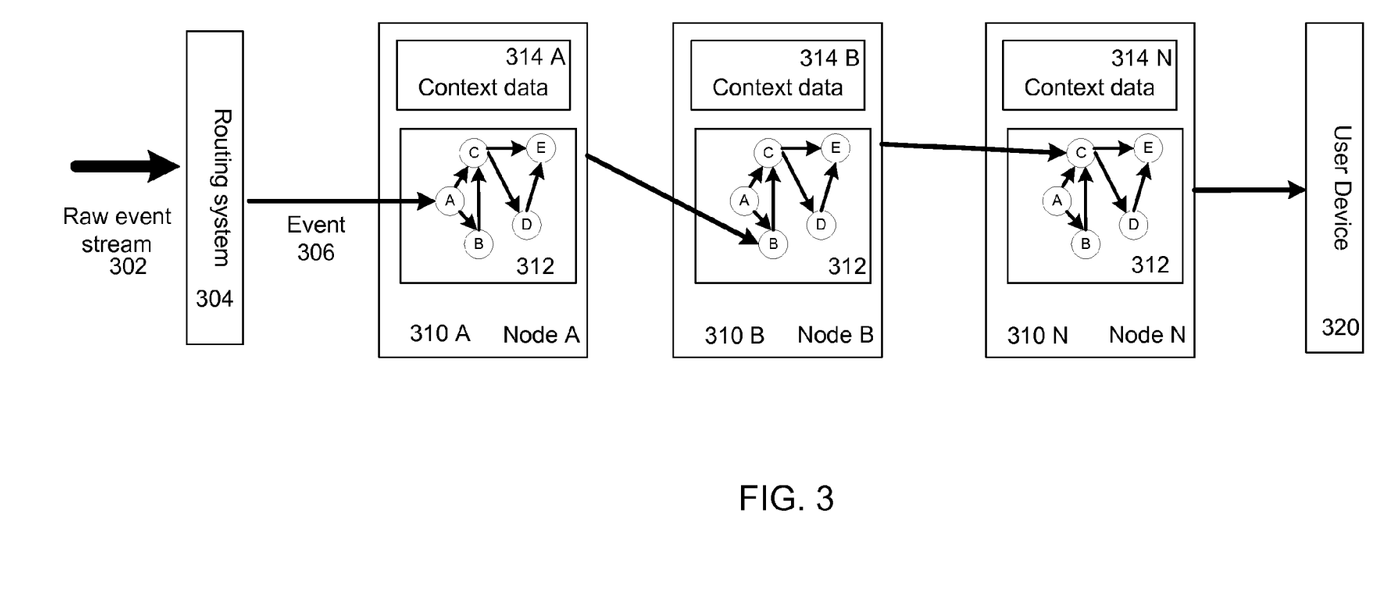
FIG. 3 illustrates an event being processed by an example stream processing system.

FIG. 3 illustrates an event 306 being processed by an example stream processing system 300. The stream processing system 300 includes multiple connected stream processing nodes 310, e.g., stream processing nodes 310A-N.

The stream processing system 300 receives a raw event stream 302. The raw event stream 302 can be received by a routing system 304 over a network, e.g., the Internet. The routing system 304 routes an event 306 included in the raw event stream 302 to a stream processing node 310A upon determining that context data 314A for the event 306 is likely to be maintained in operational memory of the stream processing node 31 OA.

In some implementations the event 306 includes a data affinity hint which the routing system 304 can obtain and use to route the event 306. The routing system 304 can determine a particular partition of context data that includes context for the event 306, and identify a stream processing node storing the partition.

In the example of FIG. 3, the routing system has determined that stream processing node 310A has context data 314A for the event 306. The stream processing node 310A includes an application 312 identified by a series of functional modules of a topology, e.g., functional modules A-E. The application 312 is executed in the same operating system process, e.g., a JAVA virtual machine process, as the process storing context data 314A in operational memory, e.g., random access memory, of the stream processing node 310A.

The stream processing node 310A performs operations identified by functional module A on the event 306. Since the context data 314A is stored in the same process as the executing application, the application can obtain context data quickly and without interprocess communication or inter-node communication.

Upon completion of the operations in functional module A, the stream processing node 310A provides the event through a logical channel to functional module B. The logical channel includes an operation to modify the data affinity hint included in the event, informing the stream processing node 310A to route the event to a different stream processing node 310B. In some implementations each stream processing node 310A-N stores information identifying which nodes store respective partitions of context data. The modified data affinity hint identifies that the subsequent functional module in the topology needs different context data, stored on the stream processing node 310B.

The stream processing node 310B receives the event 306 and processes the event 306 using the operations identified by functional module B and the context data 314B. Upon completion of the operations in functional module B the event passes through a logical channel to the next functional module. The logical channel has modified the data affinity hint included in the event 306, so the event is routed to a different stream processing node 310N.

The stream processing node 310N receives the event 306 and processes the event 306 using the operations identified by functional module C and the context data 314N. Upon completion of the operations in functional module C, the event passes through a logical channel to the next functional module. As shown, the logical channel has not modified the data affinity hint included in the event 306, so the event stays in stream processing node 310N.

The user device 320 receives the output of the application, e.g., the processed event 306, after the application has completed processing the remaining functional modules, e.g., functional modules D and E, on event 306.

Figure 4:
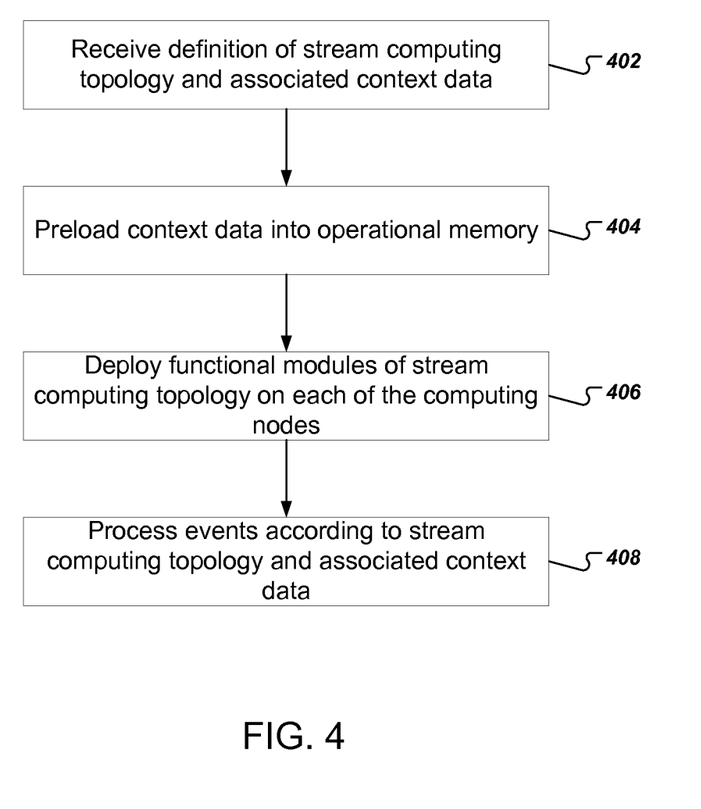
FIG. 4 is a flow chart of an example process for defining a stream computing topology and associated context data.

FIG. 4 is a flow chart of an example process for defining a stream computing topology and associated context data. In general, a system receives, from a developer, a definition of a topology of functional modules for processing events and associated context data. The system can then preload the context data into operational memory of one or more computing nodes and initialize the functional modules of the stream computing topology on each of the one or more computing nodes. The process will be described as being performed by an appropriately programmed system of one or more computers.

The system receives a specification of the stream processing topology and the definitions of the functional modules of the topology (402). A developer can use a particular stream processing development framework to define a specification of the stream computing topology. The developer specifies the operations to be performed on events by each functional module of the stream computing topology, as well as the channels between functional modules in the topology.

The developer can also specify the context data required to process events by some functional modules. For example, the developer can specify that some functional modules of the stream computing topology can make use of context data that includes customer information for telecommunications customers.

The system preloads context data into operational memory of computing nodes of the stream computing system (404). The system can preload the context data into operational memory to give low latency access for functional modules of the stream computing system.

When the context data is larger than the operational memory of a single computing node, the system can partition the context data across multiple computing nodes of the system. For example, the system can preload the customer context data by partitioning the customer data according to last name among multiple computing nodes of the stream processing system.

The system deploys functional modules of the stream computing topology on each of the computing nodes of the stream computing system (406). To reduce latency for processing events by the stream computing system, the system can deploy each functional module defined by the developer to each of the computing nodes in the stream processing system. Thus, an event can be processed according to the stream computing topology by a single computing node of the stream processing system.

The system can hide implementation details of the stream computing system from the developer. Thus, the developer need not specify that all functional modules are deployed on a same computing node and need not specify that the context data will be preloaded into operational memory of the system.

The system processes events using the stream computing topology and associated context data (408). After deploying the functional modules of the stream computing topology and preloading context data into operational memory of the computing nodes, the system can begin processing events.

Figure 5:
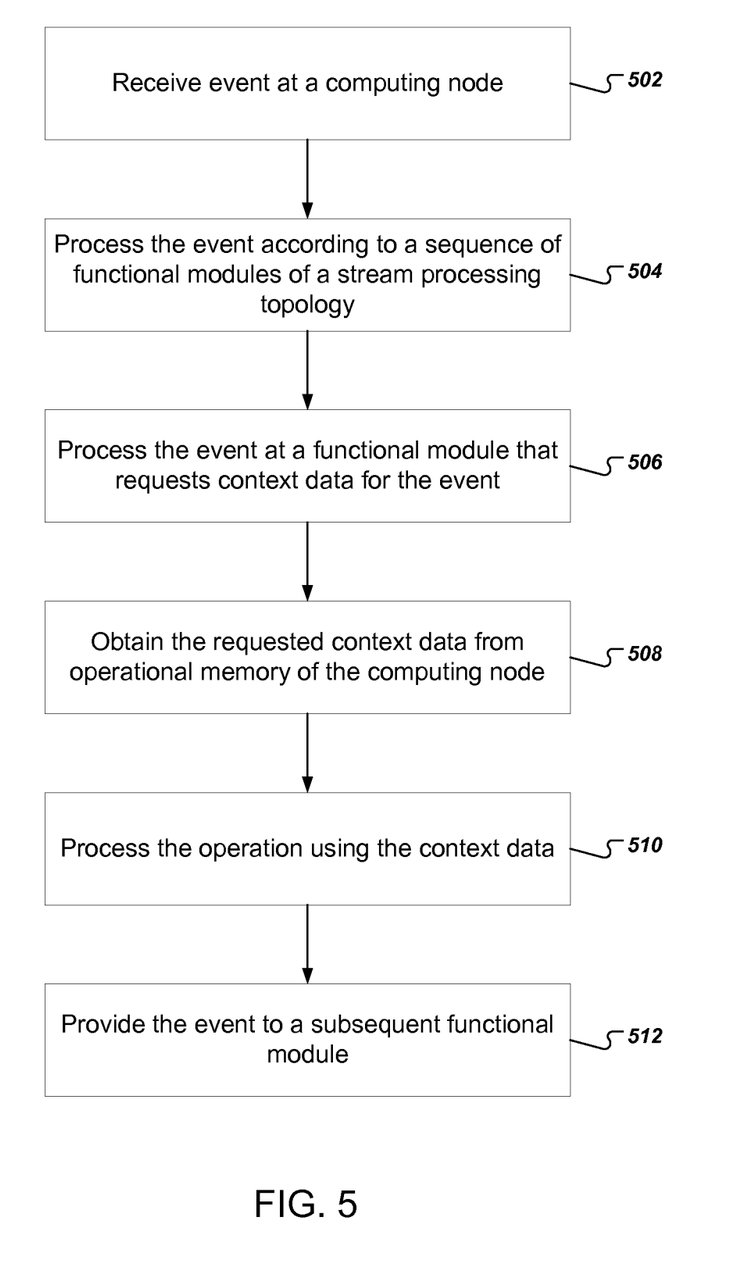
FIG. 5 is a flow chart of an example process for processing events by a stream processing system.

FIG. 5 is a flow chart of an example process for processing events by a stream processing system. In general, a computing node processes an event according to functional modules of a stream processing topology using context data stored in operational memory of the computing node. The process can be implemented by one or more computer programs installed on one or more computers. The process will be described as being performed by a system of one or more appropriately programmed computers, e.g., the stream processing system 202 of FIG. 2.

The system receives an event at a computing node included in the system (502). The system can receive an event stream that includes the event over a network, e.g., the Internet, or can receive multiple events in a batch. Events are identifiable occurrences, e.g., a telephone call being placed, a patron buying coffee at a business, a measured wind speed at a particular wind turbine. Each event has included information, e.g., a telephone number, a type of coffee, the price of the coffee, waiting time of the patron buying coffee.

The system receives the event stream and routes each event to a particular computing node, e.g., stream processing node 220. Each event is routed according to where context data of the event is likely to be maintained. In some implementations each event can include a data affinity hint, which the system can use to determine a partition of context data, and a computing node maintaining that partition of context data.

The system processes the event according to a sequence of functional modules of a stream processing topology (504). Each computing node of the system includes an application that includes the functional modules arranged in a stream processing topology that identify operations to be performed on the event.

In some implementations, all functional modules of the stream processing topology are executed within a same operating system process. Furthermore, each computing node includes modules for all functional modules of the stream process topology. Thus, the application can process some events without routing the events between different computing nodes.

Each functional module in the stream processing topology is connected by a logical channel that can identify a subsequent functional module in the topology to route the event. The logical channel can include an operation to modify the data affinity hint included in the event, identifying that the subsequent functional module needs a different partition of context data. The system can perform the operation included in the logical channel to modify the data affinity hint and determine whether the different context data is stored on the computing node, or a different computing node.

The system processes the event at a functional module that requests context data for the event (506). The functional module includes an operation that requests context data to process the event. For instance, the event can represent a telephone call being placed from a particular phone number, and the operation in the functional module can request access to a user account number associated with the particular phone number.

In some implementations, the computing node executes the application in a same operating system process, e.g., a JAVA virtual machine process, also maintains the context data stored in the operational memory.

The system obtains the requested context data from operational memory (508). Because the context data is maintained by the same process that is executing the application, the system can quickly obtain the requested context data, avoid data locking issues, race conditions, and not have to call and obtain context data from an outside database.

The system processes the operation using the context data (510). The system performs the operation in the functional module on the event using the context data. In performing the operation on the event, the system can modify the event based on the particular operation of the functional module.

Some operations may also modify the context data associated with the event. Thus, when the system accesses the context data for a subsequent event, the system will retrieve the modified context data. For example, if the context data included a count of the total number of telephone calls placed from a particular user account, the system can modify the context data by updating the count. Subsequent operations by functional modules can access the updated count.

The system provides the event to a subsequent functional module (512). After the operations in the functional module have completed, the system provides the event to the next functional module in the stream processing topology through a logical channel. The logical channel can optionally include an operation to modify the data affinity hint included in the event. If the system determines, from the data affinity hint, that context data for the subsequent functional module is located in operational memory of a different computing node, the system can provide the event to the different computing node. Since each computing node includes the same application, the system can provide the event to the same subsequent functional module.

The system processes the event according to the functional modules included in the stream processing topology, until the final functional module. After the system processes the final functional module, the modified event is muted as an output to a user device.

Figure 6:
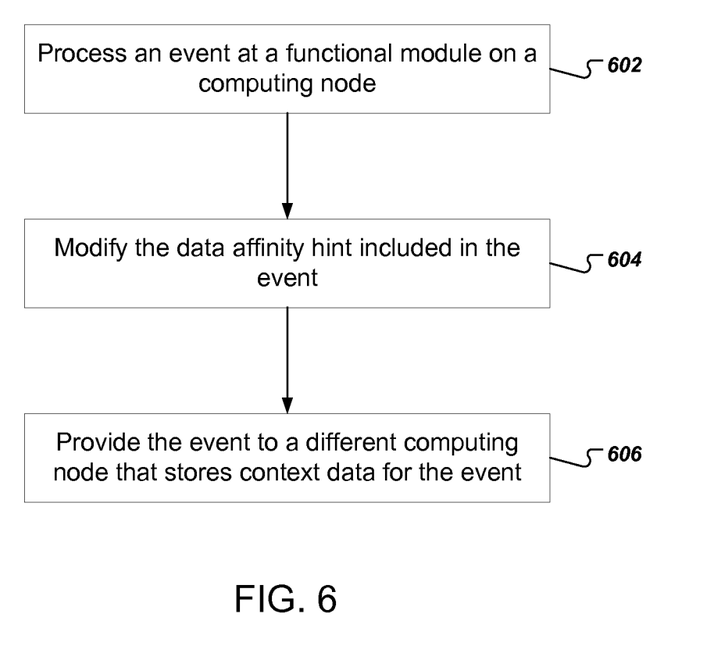
FIG. 6 illustrates an example process of providing an event to a different computing node.

FIG. 6 illustrates an example process of providing an event to a different computing node. In general, a system can receive an event at a computing node, and process the event according to operations identified in a functional module. After processing, the computing node can determine that an operation identified in a subsequent functional module requires context data that is stored in a different computing node. The system can route the event to the different computing node for processing. The process will be described as being performed by a computing node, e.g., the stream processing node 220 of FIG. 2.

The computing node processes an event at a functional module (602). As described above, each computing node stores a same application represented as multiple functional modules that include operations to be performed on events. The computing node processes the event with the operations included in the functional module.

After completion of the operations in the functional module, the computing node provides the event to a logical channel that connects the functional module to a subsequent functional module. The logical channel can include operations to modify a data affinity hint included in the event. As described above, the data affinity hint is an identifier used by the computing node to determine a particular computing node storing context data needed by the subsequent functional module. Context data can be partitioned across the multiple computing nodes, with each computing node including a partition.

The computing node uses the data affinity hint to determine a particular partition that includes context data for the event. The computing node can obtain the data affinity hint and identify the particular computing node storing that partition using information stored on each computing node. In some implementations the information can be a mapping between respective partitions of context data and identifiers of computing nodes.

The computing node modifies the data affinity hint included in the event (604). The computing node provides the event to a logical channel, and performs an operation to modify the data affinity hint.

In some implementations the operation included in the logical channel can identify the type of context data needed, and the computing node can determine a mapping between a partition of the needed context data and the event. The computing node can determine the mapping by computing a hash function of data included in the event, e.g., a telephone number that placed a call, the name or first letter of a patron that ordered coffee, and obtaining a map of the data to a number. The number can correspond to the identifier of a partition of context data. Alternatively, the system can first modify the number by taking the modulus of the number with a particular selected constant. The result of the modulus can correspond to the identifier of the partition.

In some other implementations, the system can determine the mapping by the computing node computing the modulus of the value of a particular data attribute of the event with a number of total partitions of context data.

The computing node determines the mapping and then identifies the computing node that stores the partition. The computing node can access information identifying computing nodes that store particular partitions of context data.

The system can then modify the data affinity hint of the event to correspond to the determined partition identifier. For example, the system can modify the data affinity hint by modifying a tuple of the event corresponding to the data affinity hint or by modifying metadata of the event.

From this information, the computing node can determine whether the event should be routed to a different computing node. The system, e.g., stream processing node 220, can have different types of context data needed for an event stored in the same computing node. In this way the system can reduce the number of events that are moved between computing nodes, increasing the throughput of the system. However if the computing node determines that the partition of context data is stored in a different computing node, the computing node then provides the event to the different computing node.

The computing node provides the event to a different computing node (606). As described above, upon determining that the context data needed for a subsequent functional module is stored in a different computing node, the computing node provides the event. Since each computing node includes the same application, the event is provided to the subsequent functional module and processed with context data stored in operational memory of the computing node.

The above discussion describes that events in the event stream can be routed between different computing nodes, e.g., based on data affinity of each event. However, in some implementations a subset of the event stream can be routed to an external computer, e.g., over a network. The routing system, e.g., routing system 240, or a computing node, e.g., stream processing node 220, can route a subset of events based on specific criteria. The specific criteria can include determining that metadata, or data included in a tuple defining the event, satisfies a specific relationship or function. For example, one or more phone call events can be routed to an external system upon determining that the phone number matches a particular number, an area code, a time stamp, and so on.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving an event at a first computing node of a stream processing system, the stream processing system comprising a plurality of computing nodes, wherein each computing node of the stream processing system has installed a same stream processing topology of functional modules, wherein context data related to events received by the stream processing system is partitioned among the plurality of computing nodes, and wherein each partition of context data is stored in operational memory of each respective computing node;
obtaining, by the first computing node of the plurality of computing nodes, context data related to the event from operational memory of the first computing node;
processing, by the first computing node, an operation of a functional module of the stream processing topology using the context data obtained from the operational memory of the first computing node; and
providing, to a subsequent functional module of the stream processing topology, a modified event according to the operation of the functional module of the stream processing topology.

2. The method of claim 1, wherein each functional module of the stream processing topology installed on each computing node executes within a same operating system process of the computing node.

3. The method of claim 1, wherein processing the operation of the functional module using the context data comprises modifying the context data in operational memory of the first computing node.

4. The method of claim 3, further comprising:
receiving, by the first computing node, a different second event;
obtaining, by the first computing node, the modified context data from operational memory; and
processing, by the first computing node, the operation of the functional module of the stream processing topology using the modified context data obtained from the operational memory of the first computing node.

5. The method of claim 1, further comprising:
receiving, by the first computing node, a different second event;

determining that an operation of the stream processing topology requests access to context data related to the second event based on a particular data attribute of the different event;
determining that the requested context data is maintained in a partition stored on a different computing node; and
providing the second event to the different computing node.

6. The method of claim 1, further comprising:
maintaining, by the first computing node, functional modules of the stream processing topology and the context data within a same operating system process.

7. The method of claim 1, further comprising:
receiving, at the stream processing system, the event;
determining a computing node maintaining a partition of context data related to the event; and
routing the event to the determined computing node.

8. The method of claim 7, wherein determining a computing node comprises:
processing an operation to modify a data affinity hint in the event;
determining, from the modified data affinity hint, an identifier of a partition of context data stored by a different computing node of the stream processing system; and
providing the modified event to the different computing node of the stream processing system.

9. A stream processing system comprising:
one or more computing nodes, wherein each computing node of the stream processing system has installed a same stream processing topology of functional modules, wherein context data related to events received by the stream processing system is partitioned among the plurality of computing nodes, and wherein each partition of context data is stored in operational memory of each respective computing node, and one or more storage devices storing instructions that are operable, when executed by the one or more computing nodes, to cause the one or more computing nodes to perform operations comprising:
receiving an event at a first computing node of the stream processing system,
obtaining, by the first computing node of the plurality of computing nodes, context data related to the event from operational memory of the first computing node;
processing, by the first computing node, an operation of a functional module of the stream processing topology using the context data obtained from the operational memory of the first computing node; and
providing, to a subsequent functional module of the stream processing topology, a modified event according to the operation of the functional module of the stream processing topology.

10. The stream processing system of claim 9, wherein each functional module of the stream processing topology installed on each computing node executes within a same operating system process of the computing node.

11. The stream processing system of claim 9, wherein processing the operation of the functional module using the context data comprises modifying the context data in operational memory of the first computing node.

12. The stream processing system of claim 11, wherein the operations further comprise:
receiving, by the first computing node, a different second event;
obtaining, by the first computing node, the modified context data from operational memory; and
processing, by the first computing node; the operation of the functional module of the stream processing topology using the modified context data obtained from the operational memory of the first computing node.

13. The stream processing system of claim 9, wherein the operations further comprise:
receiving, by the first computing node, a different second event;
determining that an operation of the stream processing topology requests access to context data related to the second event based on a particular data attribute of the different event;
determining that the requested context data is maintained in a partition stored on a different computing node; and
providing the second event to the different computing node.

14. The stream processing system of claim 9, wherein the operations further comprise:
maintaining, by the first computing node, functional modules of the stream processing topology and the context data within a same operating system process.

15. The stream processing system of claim 9, wherein the operations further comprise:
receiving, at the stream processing system, the event;
determining a computing node maintaining a partition of context data related to the event; and
routing the event to the determined computing node.

16. The stream processing system of claim 15, wherein determining a computing node comprises:
processing an operation to modify a data affinity hint in the event;
determining, from the modified data affinity hint, an identifier of a partition of context data stored by a different computing node of the stream processing system; and
providing the modified event to the different computing node of the stream processing system.

17. A computer program product, encoded on one or more non-transitory computer storage media, comprising instructions that when executed by one or more computers cause the one or more computers to perform operations comprising:
receiving an event at a first computing node of a stream processing system, the stream processing system comprising a plurality of computing nodes, wherein each computing node of the stream processing system has installed a same stream processing topology of functional modules, wherein context data related to events received by the stream processing system is partitioned among the plurality of computing nodes, and wherein each partition of context data is stored in operational memory of each respective computing node;
obtaining, by the first computing node of the plurality of computing nodes, context data related to the event from operational memory of the first computing node;
processing, by the first computing node, an operation of a functional module of the stream processing topology using the context data obtained from the operational memory of the first computing node; and
providing, to a subsequent functional module of the stream processing topology, a modified event according to the operation of the functional module of the stream processing topology.

18. The computer program product of claim 17, wherein each functional module of the stream processing topology installed on each computing node executes within a same operating system process of the computing node.

19. The computer program product of claim 17, wherein processing the operation of the functional module using the context data comprises modifying the context data in operational memory of the first computing node.

20. The computer program product of claim 19, wherein the operations further comprise:
receiving, by the first computing node, a different second event;
obtaining, by the first computing node, the modified context data from operational memory; and
processing, by the first computing node, the operation of the functional module of the stream processing topology using the modified context data obtained from the operational memory of the first computing node.

21. The computer program product of claim 17, wherein the operations further comprise:
receiving, by the first computing node, a different second event;
determining that an operation of the stream processing topology requests access to context data related to the second event based on a particular data attribute of the different event;
determining that the requested context data is maintained in a partition stored on a different computing node; and
providing the second event to the different computing node.

22. The computer program product of claim 17, wherein the operations further comprise:
maintaining, by the first computing node, functional modules of the stream processing topology and the context data within a same operating system process.

23. The computer program product of claim 17, wherein the operations further comprise:
receiving, at the stream processing system, the event;
determining a computing node maintaining a partition of context data related to the event; and
routing the event to the determined computing node.

24. The computer program product of claim 23, wherein determining a computing node comprises:
processing an operation to modify a data affinity hint in the event;
determining, from the modified data affinity hint, an identifier of a partition of context data stored by a different computing node of the stream processing system; and
providing the modified event to the different computing node of the stream processing system.

* * * * *

UNITED STATES PATENT AND TRADEMARK OFFICE
CERTIFICATE OF CORRECTION

PATENT NO.       : 9,300,712 B2  
APPLICATION NO.  : 14/737746  
DATED            : March 29, 2016  
INVENTOR(S)      : Jeffrey Mark Nick et al.

Page 1 of 1

It is certified that error appears in the above-identified patent and that said Letters Patent is hereby corrected as shown below:

In the Claims  
Column 16, line 1, in Claim 12: delete "node;" and insert -- node, --, therefor.

Signed and Sealed this  
Twenty-first Day of June, 2016

Michelle K. Lee  
*Director of the United States Patent and Trademark Office*